United States Patent [19]
Whitaker

[11] Patent Number: 5,483,924
[45] Date of Patent: Jan. 16, 1996

[54] DEVICE FOR TRAINING A BIRD IN A CAGE

[76] Inventor: Russell C. Whitaker, 6305 N. O'Connor Blvd., Suite 119, LB11, Irving, Tex. 75039

[21] Appl. No.: 311,495

[22] Filed: Sep. 23, 1994

[51] Int. Cl.[6] .......................... A01K 15/02; A01K 45/00
[52] U.S. Cl. .......................... 119/713; 119/174; 119/719; 119/905
[58] Field of Search .......................... 119/713, 719, 119/718, 712, 174, 905, 908; 446/227, 404; 434/185

[56] References Cited

U.S. PATENT DOCUMENTS

| | | | |
|---|---|---|---|
| 3,137,271 | 6/1964 | Etter . | |
| 3,847,120 | 11/1974 | Hicks . | |
| 4,785,433 | 11/1988 | Bush et al. | 119/719 |
| 4,896,305 | 1/1990 | Gimbal | 119/905 |
| 5,010,851 | 4/1991 | Gvaryahu et al. | 119/905 |
| 5,351,645 | 10/1994 | Brennon | 119/18 |
| 5,365,879 | 11/1994 | Ying-Kuan | 119/18 |

FOREIGN PATENT DOCUMENTS

| | | | |
|---|---|---|---|
| 3728591 | 3/1989 | Germany | 119/713 |
| 2245094 | 12/1991 | United Kingdom | 119/174 |

OTHER PUBLICATIONS

Archer ISD 1000A Voice Record/Playback IC Brochure, 1992, Tandy Corporation.

*Primary Examiner*—Todd E. Manahan
*Attorney, Agent, or Firm*—George R. Schultz; Harris, Tucker & Hardin

[57] ABSTRACT

A device that automatically repeats a prerecorded message for training a bird to mimic the message. The device is sized such that it may be attached to a bird cage by adjustable clips. The device electronically records and stores a message spoken by the user and plays back the message through a speaker for the bird at intervals determined by a timer. A user may record any type of message that the user wishes for the bird to learn. The message may be of variable length up to 60 seconds in duration. The user may select a delay interval between one second and thirty minutes by utilization of the timer. Once the user activates the play-back, the device will play the prerecorded message at a selected volume, automatically repeating in intervals equal to that selected by the user. Thereafter, the device will continue to repeat the prerecorded message at the selected interval until the user deactivates the device.

16 Claims, 3 Drawing Sheets

5,483,924

DEVICE FOR TRAINING A BIRD IN A CAGE

TECHNICAL FIELD OF THE INVENTION

The present invention relates to a device to train birds in a cage to talk. The device is attached to the bird cage and repeats a stored message at specified regular intervals.

BACKGROUND OF THE INVENTION

People have enjoyed birds as pets for centuries. Birds that could mimic human speech or "talk" have been the most prized as pets. Being able to train a bird to talk not only allows it to be more enjoyable as a pet but also increases its monetary value significantly.

For a bird to learn to talk it must be exposed to human speech. While a very small number of very talented birds can learn to talk from being exposed to normal conversation not directed at the bird, most need direct and numerous repetitions of the phase to be learned. In most cases this direct training involves someone standing at the cage repeating the same phrase over and over. Training the bird to speak even a single phrase can take hours of repetition over a several week period, if the bird will learn to speak at all. A need exists for a device to train a bird with minimal human effort.

One example for such a device is disclosed in U.S. Pat. No. 3,847,120 to Hicks entitled "Bird Training Device." The Hicks device uses a magnetic tape playback device attached to a mechanical switch. The switch is in the form of a perch in front of a mirror. The bird, being attracted by its image in the mirror, is supposed to alight on the perch and by its weight flip the switch and activate the tape. The tape, in the form of an endless loop, repeats as long as and as often a the birds weight is on the perch.

The Hicks device, therefore, relies upon the bird itself to activate the training mechanism. If the bird never lands on the perch or, even more likely, is frightened by the voice right next to it when it does land on the perch and flies away, the whole purpose of the device is thwarted. Without the bird choosing to land on the perch no training ever takes place. Also, even if the bird can be taught to land on the perch on a regular basis the Hicks device contains no method of changing the message on the magnetic tape. External machinery would be required to provide different messages for the bird.

Another similar device, this time for tending and herding cows, is disclosed in U.S. Pat. No. 3,137,271 to Etter entitled "Means and Method for Tending Domestic Animals." The Etter device uses the same magnetic tape playback means as found in Hicks, but is activated at specific times of the day by a clock mechanism, for example at dawn to tell the cows to come and be milked. The Etter device suffers from the same problem as the Hicks device in that the message can only be changed by external means. Also the Hicks device, though initiated by a clock mechanism, is designed to repeat the message at certain times of the day, it is not designed to repeat the message the specific controllable intervals optimal for training a bird.

A need exists for a device that can be attached to a bird cage and repeat messages to a bird at regular controllable intervals regardless of the birds actions. Such a device must contain a means for changing or recording new messages without the need for external machinery.

SUMMARY OF THE INVENTION

The device for training a bird in a cage which embodies the present invention is self-contained, small and light-weight enough to be attached directly to the bird's cage. The preferred embodiment of the invention includes a microphone for converting the desired message to an analog signal, a solid state analog storage means operationally connected to the microphone for storing the analog signal, a variable timing means connected to the storage means to initiate playback of the analog signal at regular controllable intervals, an amplifier connected to the output of the storage means to provide volume control, and a speaker connected to the amplifier to playback the message to the bird.

A switch is used to set the storage device to record and to initiate recording. Once the switch is closed the user speaks the desired message into the microphone. Recording stops when the storage device is full or the record mode is manually interrupted by opening the switch.

A second switch is used to activate the playback mode and variable timing means. When the switch is dosed the storage means begins playback of the stored analog signal. Once the playback is concluded the timing means is activated and measures the interval before the next playback. The timing means is made variable by a variable resistor connected to the input of the timer, the value of the resistor is determined by the user and controls the amount of time between playback. When the timing means reaches the end of selected interval for playback it activates the storage means and initiates the next playback. When the playback is concluded the timing means are activated again and the process is repeated until the second switch is opened.

The analog signal provided upon playback by the storage means is fed by direct connection to an amplifier used to provide volume control. The amplifier is connected to a variable resistor which controls the gain of the amplifier. The value of the resistor is determined by the user and controls the volume of the playback. The output of amplifier is connected to a speaker which converts the analog signal back into an audio message to be heard by the bird.

DETAILED DESCRIPTION OF THE PREFERRED EMBODIMENT

Figure 1:
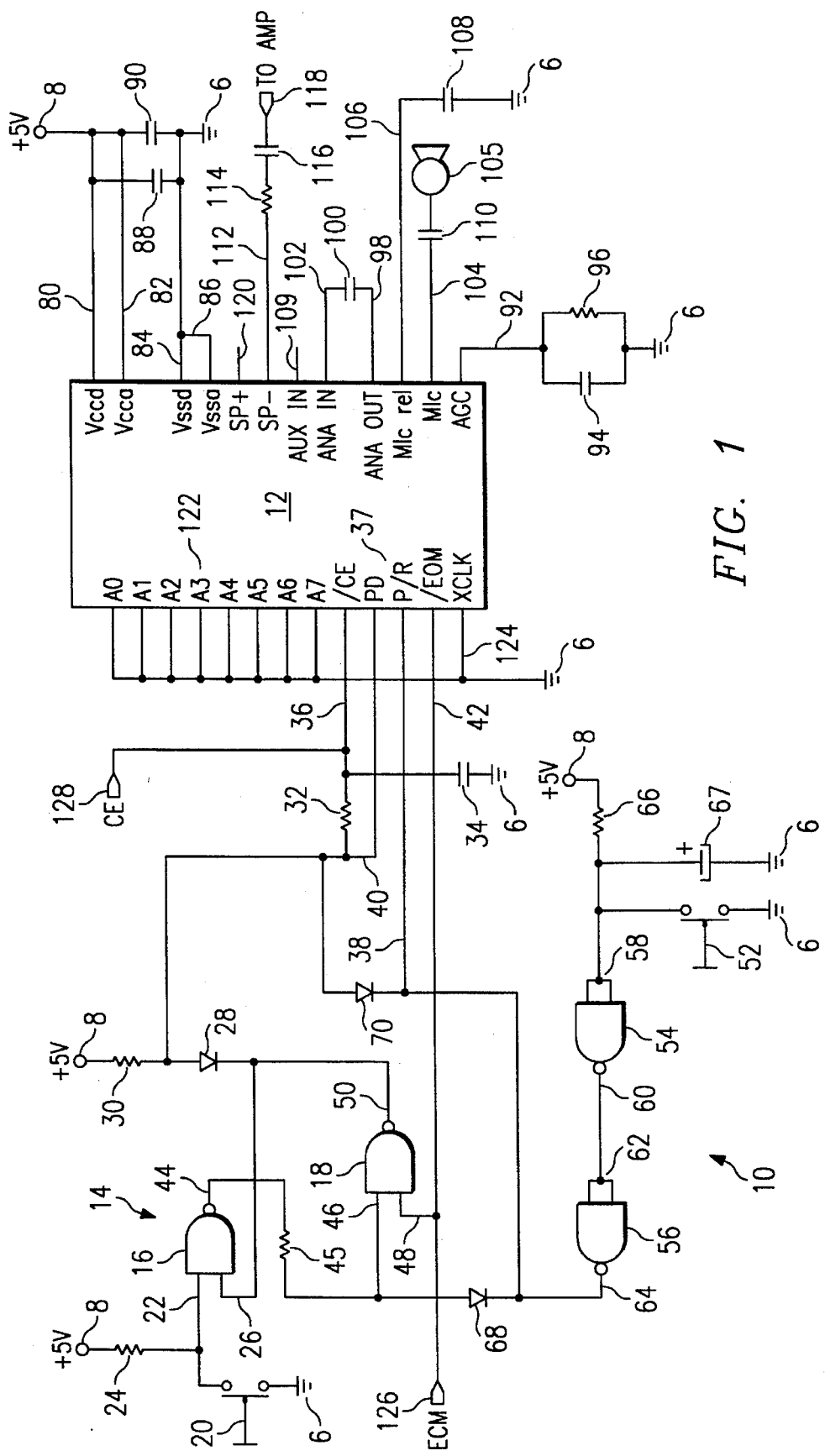
FIG. 1 is a schematic representation of the primary circuit of the device for training a bird in a cage.

FIG. 1 is a representation of circuit 10, the main functional circuit of the device. Circuit 10 is comprised of storage device 12, an integrated circuit chip with means to store an analog signal, and supporting components.

Initiation of playback of the analog signal is controlled by cross-coupled latch 14. The cross-coupled latch is comprised of first NAND gate 16 and second NAND gate 18.

Input 22 of first NAND gate 16 is connect to resistor 24 and first switch 20. The other terminal of switch 20 is grounded. The other terminal of resistor 24 is connected to voltage high (±5 V) 8, this pulls input 22 high when firs switch is open. Input 26 of first NAND gate 16 is pulled high by resistor 30, connected at its other terminal to voltage high.

Figure 2:
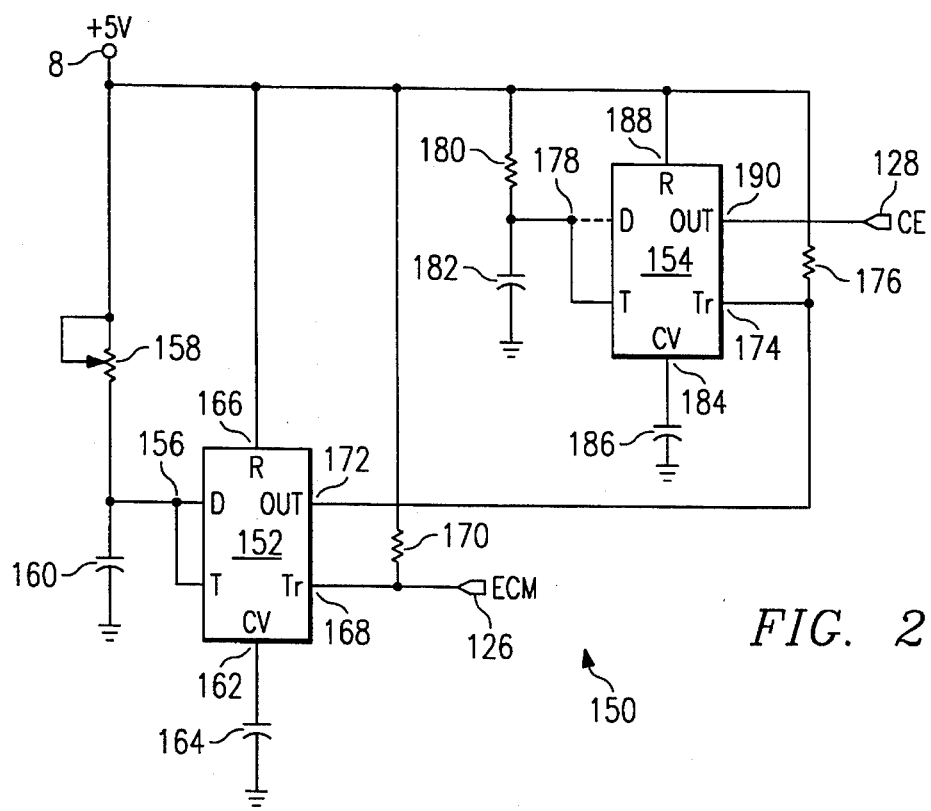
FIG. 2 is a schematic representation of the timing circuit used to activate playback after a specified controllable interval.

Output 44 of first NAND gate 16 is connected to input 46 of second NAND gate 18 through resistor 45. Resistor 45 serves to ensure that the cross-coupled latch powers up in a reset state and should be of sufficient value to accomplish that task. Input 48 of second NAND gate 18 is connected to the end of message signal ("EOM") pin 42 of storage device 12. Referring briefly to FIG. 2 it can be seen that "EOM" is held high by resistor 170 which is connected to a voltage high 8 of ±5 V until the storage device 12 has finished playback of the analog signal at which time it outputs a low signal. Returning to FIG. 1, output 50 of second NAND gate 18 is connected to input 26 of first NAND gate 16, and to the control pins 37 of storage device 12 through diode 28. Diode 28 isolates output 50 when it is in a high state from the control pins. The control pins consist of "/CE", 36, "P/R", 38, and "PD", 40. "/CE" 36 is active low and starts playback and record operations. The state of "P/R" 38 determines whether playback or record is initiated when /CE is activated. "P/R" places the storage device 12 in playback mode when the pin is at a high voltage and places the storage device 12 in record mode when the pin is at a low voltage. "PD" 40 activates power down mode and resets the memory of storage device 12 when PD 40 is high. Resistor 32 and capacitor 34 provide set up time for /CE when record mode is selected by setting P/R low.

Second switch 52 is connected between ground 6 and the inputs 58 to the third NAND gate 54. The inputs 58 are held high by pull-up resistor 66 connected between inputs 58 and voltage high 8 while switch 52 is open. Polarized capacitor 67 is connected between inputs 58 and ground, and serves to debounce switch 52. The output 60 of third NAND gate 54 is connected to the inputs 62 of fourth NAND gate 56. The output 64 of fourth NAND gate 56 is connected to P/R. The output 64 is also connected through diode 70, used to isolate a high output from fourth NAND gate 56 from analog storage device 12, to resistor 32 and capacitor 34, which serve to provide the set up time for /CE 36 and PD 40.

When first switch 20 is closed, input 22 is grounded and goes low causing the output 44 of first NAND gate 16 and therefore input 46 to be high. With input 48 driven high by a high signal at EOM 42, the output 50 of second NAND gate 18 is driven low thereby activating /CE 36 and PD 40 and initiating playback of the stored analog signal. Diode 70 prevents the low output 50 of the second NAND gate 18 from driving P/R 38 low, which would place storage device 12 into record mode. At the end of the playback, EOM is driven low by the storage device 12, resetting the cross-coupled latch 14, which places PD in a high state and powers o down the storage device 12. The low EOM pulse also provides the input to the timing means 126.

Recording a new message is accomplished by closing the second switch 52 causing a low voltage at the inputs 58. The low inputs 58 of third NAND gate cause the output 60 of the third NAND gate to be high which causes the inputs 62 of the fourth NAND gate 56 to be high. The high state of the inputs 62 cause the output 64 of the fourth NAND gate to be driven low. The low output 64 of the fourth NA gate 56 drives P/R 38 low, thereby placing the storage device 12 in record mode. The output 64 is also connected to PE and PD through diode 70, resistor 32 and capacitor 34. A low signal at 64 drives PE and PD low, initiating recording of the analog signal, after a brief set up time provided by resistor 32 and capacitor 34. Recording stops when the analog signal fills the storage device 12 buffer or when manually stopped by opening second switch 52.

Power is supplied to the storage device by connecting voltage high 8 to VCCD 80. This supplies power to the digital sections of storage device 12. VCCA 82 is also connected to voltage high 8 and supplies power to the analog sections of storage device 12. Both VCCD and VCCA are connected to high frequency decoupling capacitors, 88 and 90, which are then connected to ground 6.

AGC input 92 of storage device 12 provides automatic gain control for the microphone preamp by forming a feedback loop to adjust the gain of the preamp for changes in the analog signal. The attack and release time constants for the AGC input are provided by capacitor 94 and resistor 96. Pin 98 of the storage device 12 is the direct analog output of microphone preamp. It is connected through capacitor 100 to pin 102 which is the input to the amp that drives the storage array of storage device 12. The storage array of storage device 12 samples the analog signal at a predetermined frequency and stores the voltage value in one of a plurality of non-volatile cells. The preferred embodiment uses one of the ISD1000A series, ISD 1100 series, ISD1200 series, ISD1400 series or ISD2500 series of ICs. The selection of the chip corresponds to the length of the analog signal to be stored. The ISD chips provide a maximum storage capability of 10 to 60 seconds depending on the chip selected.

Pin 104 is the input to the microphone preamp of storage device 12. Pin 104 is connected to the microphone 105 thorough coupling capacitor 110. The microphone 105 is then connected to ground 6. The inverting input 106 to the microphone preamp is connected to ground though a capacitor 108 and provides noise canceling to the analog signal. In the preferred embodiment, capacitor 108 is the same value as decoupling capacitor 110.

Figure 3:
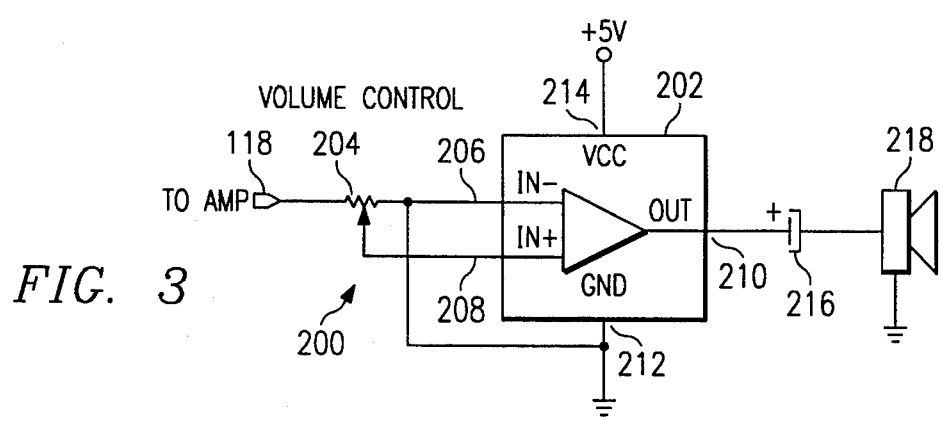
FIG. 3 is a schematic representation of the amplifier to provide volume control for the output of the speaker.

Pin "SP–" 112 is the output of storage device 12 which provides an analog signal to the input 118 of the amplifier circuit 200 of FIG. 3 through resistor 114 and capacitor 116. Pin "SP+" 120 is an alternate output of storage device 12 and should remain unconnected if not used. "Aux In" 109 is not used and should also remain unconnected. Address pins 122 of storage device 12 are unused and are tied to ground 6. The internal clock of storage device 12 is enabled by connecting the extend clock input 124 to ground 6.

Node 126 is connected to EOM 42 which is used to initiate the variable timing device. Node 128 represents the output of timing means circuit 150 of FIG. 2.

FIG. 2 shows the circuit 150 which represents the preferred embodiment of the timing means. The preferred embodiment uses two timers 152 and 154 that generate a square wave pulse at the end of a predetermined, but variable, interval. The timers 152 and 154 are connected in series to provide the optimal range of specified controllable intervals. The circuit of FIG. 2 shows two NE555 ICs, 152 and 154, which serve as the timers. The first timer 152 is configured with the inputs 156 connected to variable resistor 158 and capacitor 160 which determine the time delay. The capacitor 160 can be changed to extend the interval time. For example, using the variable resistor 158 a capacitor of 100 microfarads would provide a maximum specified controllable interval of five minutes. Using a capacitor 160 with a value of 1000 microfarads extends the maximum specified controllable interval to thirty minutes. The control voltage input 162 of the first timer 152 is connected to ground 6 through capacitor 164 which prevents false triggering. The reset input 166 is connected directly to high voltage 8.

The output 172 of first timer 152 is connected directly to the trigger 174 of second timer 156. Trigger 174 is held high by resistor 176 connected between trigger 174 and high voltage 8. The time delay of second timer 154 is fixed by resistor 180 connected between high voltage 8 and inputs 178, and by capacitor 182 connected between inputs 178 and ground 6. Control voltage 184 is connected to ground 6 through capacitor 186 to prevent false triggering just as before. Reset input 188 is again connected directly to high voltage 8. The output 190 of second timer 154 is connected to node 128 of FIG. 1.

The time delay for the first timer 152 is controllable by the user by varying the value of the variable resistor 158. The first timer 152 is activated by a low pulse at trigger 168 from input 126 supplied by EOM 42 from FIG. 1. The trigger 168 is kept high by pull up resistor 170 until taken low by the signal input from node 126. The output 172 at the end of the timing cycle of first timer 152 activates second timer 154. The output 190 of second timer 154 at the end of the timing cycle activates playback by causing /CE 36 and PD 40 to go low. A low pulse of EOM 42 at the end of the analog signal restarts the timing circuit 150.

FIG. 3 shows circuit 200 which provides the volume control for the analog signal on playback from the storage device 12. Volume control is provided by the variable resistor 204 which controls the gain for the op-amp 202. The input to the amplifier 118 is connected to the positive input 208 of the op-amp 202, through the variable resistor 204. The negative input 206 of the op-amp is connected to ground 6. The power for the op-amp is provided by connecting the VCC 214 of the op-amp to high voltage 8 and the op-amp is grounded by connecting the op-amp ground 212 directly to ground 6. The output 210 of the op-amp is connected to the speaker 218 through a polarized coupling capacitor 216.

Figure 4:
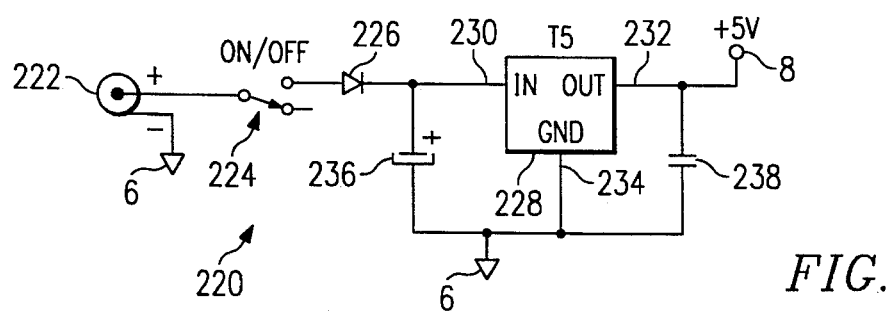
FIG. 4 is a schematic representation of the on/off switch for the device and the power supply to the circuits of FIGS. 1–3.

Voltage high 8 is provided by circuit 220 shown in FIG. 4. Battery 222 is connected between on/off switch 224 and ground 6. Diode 226 is connected between on/off switch 224 and regulator 228 to isolate the battery 222 when switch 224 is closed. The input 230 of the regulator 228 is connected to ground through the polarized coupling capacitor 236, and the output 232 of regulator 228 is connected to ground through coupling capacitor 238. The ground pin 234 of regulator 228 is connected directory to ground 6. The output 232 of the regulator 228 is voltage high 8 used in FIGS. 1–4.

The following element values were employed in the circuits of FIGS. 1–4 in one successful embodiment of the invention:

| Drawing No. | Element | Part No. or Value |
|---|---|---|
| 12 | Voice Record/ Playback IC | Any of the ISD1000A, ISD1100, ISD1200, ISD1400 or ISD2500 series of ICs |
| 16, 18, 54, 56 | NAND gate | 4093 Schmitt trigger quad NAND package |
| 20, 52 | Single Position Single Throw Switch | |
| 28, 68, 70 | Diode | 1N914 |
| 226 | Diode | 1N4001 |
| 152, 154 | Timer | NE555 |
| 228 | T5 | 7805 |
| 202 | Operational Amplifier | LM386 |
| 158, 204 | Variable | 1 meg |

-continued

| Drawing No. | Element | Part No. or Value |
|---|---|---|
| | Resistor | |
| 24 | Resistor | 47K |
| 30 | Resistor | 47K |
| 32 | Resistor | 47K |
| 45 | Resistor | 1K |
| 66 | Resistor | 100K |
| 96 | Resistor | 470K |
| 114 | Resistor | 1K |
| 170 | Resistor | 10K |
| 180 | Resistor | 10K |
| 176 | Resistor | 10K |
| 34 | Capacitor | .1 microF |
| 67 | Capacitor | 1 microF |
| 88 | Capacitor | .1 microF |
| 90 | Capacitor | .1 microF |
| 94 | Capacitor | 4.7 microF |
| 100 | Capacitor | 1 microF |
| 108 | Capacitor | .22 microF |
| 110 | Capacitor | .22 microF |
| 116 | Capacitor | .22 microF |
| 160 | Capacitor | 100 to 1000 microF |
| 164 | Capacitor | .05 microF |
| 182 | Capacitor | 10 microF |
| 186 | Capacitor | .05 microF |
| 216 | Capacitor | .22 microF |
| 236 | Capacitor | 220 microF |
| 238 | Capacitor | .01 microF |

Figure 5:
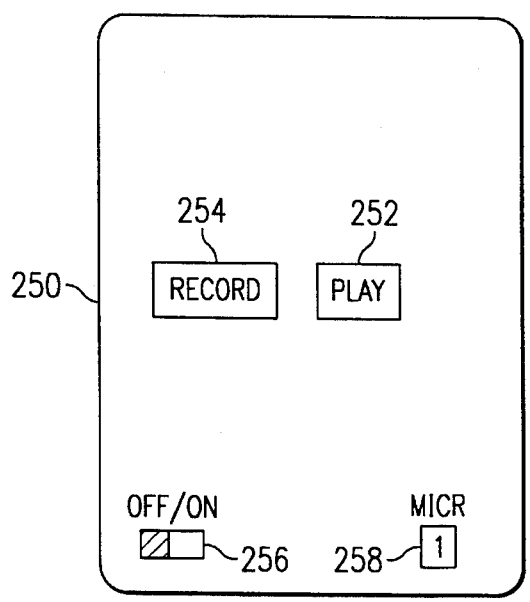
FIG. 5 is the front view of the device to train a bird in a cage.

FIG. 5 is the frontal view of the device and consists of a container 250. The front face of the container 250 contains two buttons 252 and 254. The play button 252 is operationally connected to first switch 20 in FIG. 1. The record button 254 is operationally connected to second switch 52 in FIG. 1. The front face 251 also contains an on/off switch 256 operationally connected to on/off switch 224 in FIG. 5 and an opening 258 to expose the microphone 105 in FIG. 1 to receive the analog signal.

Figure 6:
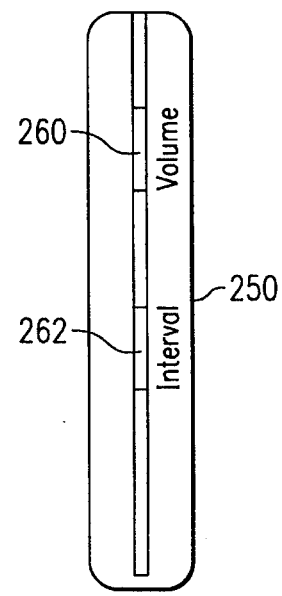
FIG. 6 is the side view of the device.

FIG. 6 is the side view of container 250. The volume dial 260 is operationally connected to the variable resistor 204 in FIG 3 and allows the user to select the volume level. The interval dial 262 is operationally connected to the variable resistor 158 in FIG. 2 and allows the user to select the specific controllable interval at which the analog signal is played back.

Figure 7:
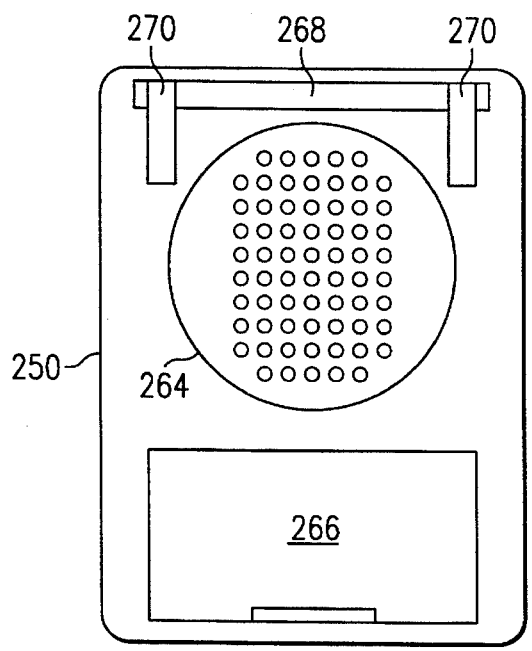
FIG. 7 is the rear view of the device.

FIG. 7 is the rear view of container 250 and contains the speaker grill 264 through which the speaker 218 from FIG. 3 plays. FIG. 7 also shows the battery receptacle 266 which houses the battery 222 from FIG. 4. Finally the rear view shows the clip means 270 by which the container 250 is attached to the cage. Slot 268 allows the clip means 270 to be adjusted for specific cages.

Figure 8:
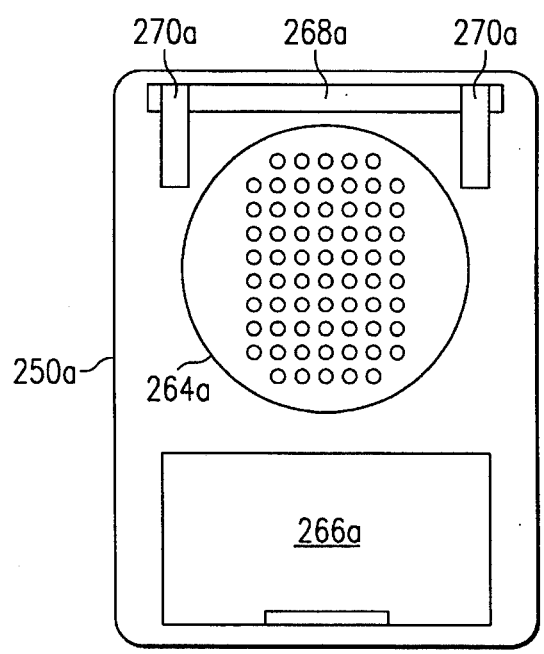
FIG. 8 is a rear view of an alternate embodiment of the device.

FIG. 8 is a rear view of an alternate embodiment of container 250. Container 250a includes speaker grill 264a and shows battery receptacle 266a. Instead of clip means 270 and slot 268 shown in FIG. 7, container 250a uses loop and hook fabric 270a held to container 250a by bar 268a.

It should be understood that various modifications can be made to the embodiments disclosed without departing from ,he spirit and scope of the present invention. Various engineering changes and choices can also be made without departing substantially from the spirit of the disclosure.

I claim:

1. A device for training birds in a cage to talk, comprising:

(a) a container;

(b) attachment means, affixed to the container, for holding the container against the cage;

(c) solid state analog storage device, resident in the container, for storing a signal up to a predetermined length, wherein the analog storage device is powered down when not playing back the stored signal; and (d) a variable timer, operatively connected to the solid state analog storage device, for playing back the stored signal at specified controllable intervals.

2. The bird training device of claim 1 wherein the signal is an analog signal.

3. The bird training device of claim 2 wherein the analog signal is a spoken message.

4. The bird training device of claim 1 wherein the predetermined length is between one and sixty seconds.

5. The bird training device of claim 1 wherein the predetermined length is between ten and fifteen seconds.

6. The bird training device of claim 1 wherein the variable timer comprises an interval timer connected to the solid state storage device.

7. The bird training device of claim 1 wherein the specified controllable intervals are between one second and thirty minutes.

8. The bird training device of claim 1 wherein the specified controllable intervals are between fifteen and thirty seconds.

9. The bird training device of claim 1 wherein attachment means comprises clip means.

10. The bird training device of claim 1 wherein attachment means comprises variably spaced clip means.

11. The bird training device of claim 1 wherein attachment means comprises loop and hook fabric.

12. A device of training birds in a cage to talk, comprising:

(a) a microphone to convert spoken messages to an analog signal;

(b) a solid state storage device, connected to the microphone, for storing and outputting the analog signal up to a predetermined length, wherein the solid state storage device is powered down when not outputting the analog signal;

(c) an amplifier connected to the solid state storage device, for providing variable amplification to the analog signal from the solid state storage device;

(d) a speaker connected to the amplifier for converting the analog signal to sound audible to the bird;

(e) a variable interval timer connected to the solid state storage device to trigger the output of the stored analog signal at specified controllable intervals;

(f) a case, operatively supporting the microphone, solid state storage device, amplifier, speaker and variable interval timer; and (g) an attachment means, affixed to the container, for attaching the container to the cage.

13. A device for training birds in a cage to talk, comprising:

(a) a case;

(b) a printed circuit board mounted in the case;

(c) a microphone to convert spoken messages to an analog signal connected to the printed circuit board;

(d) an integrated circuit mounted on the printed circuit board and connected to the microphone for storing and outputting the analog signal, wherein the integrated circuit is powered down when not outputting the analog signal;

(e) an amplifier mounted on the printed circuit board and connected to the integrated circuit for providing variable amplification to the analog signal;

(f) a variable resistor connected to the amplifier, for controlling the amplification of the amplifier;

(g) a speaker supported by the case and connected to the amplifier, for converting the amplified analog signal from the amplifier output to sound audible to the bird;

(h) a variable timer, connected to the integrated circuit to trigger the repetitive output of the stored analog signal at specified controllable intervals; and (i) an attachment means, affixed to the container, for attaching the container to the cage.

14. A method of training birds in a cage to talk, including:

(a) storing a spoken message of up to a predetermined length as a signal in a solid state storage device attached to the cage;

(b) automatically playing back the stored message;

(c) powering down the solid state device when not playing back the stored message; and (d) repeating steps (b) and (c) at specified controllable intervals.

15. The method of claim 14 wherein the specified controllable intervals are between one second and thirty minutes.

16. The method of claim 14 wherein the specified controllable interval is between fifteen and thirty seconds.

* * * * *